May 15, 1934.  E. B. FERNBERG  1,959,096
TRIM PAD FASTENER
Filed Aug. 4, 1932   2 Sheets-Sheet 2
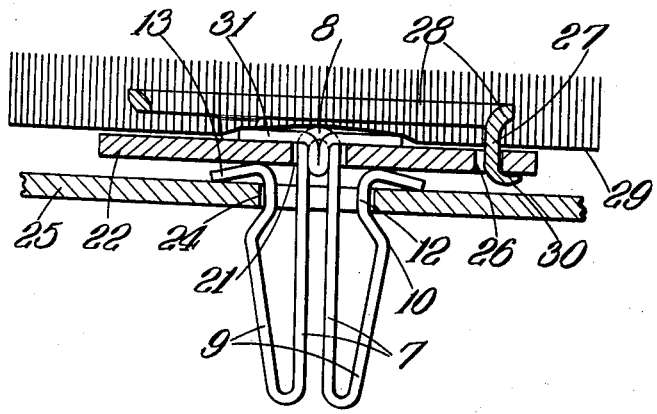
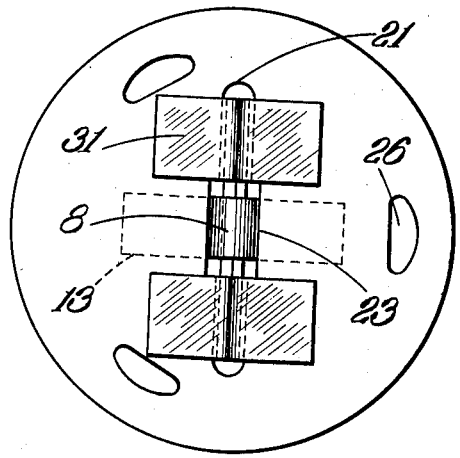
INVENTOR
Eric Birger Fernberg.
BY
John P. Tarbox
ATTORNEY Patented May 15, 1934

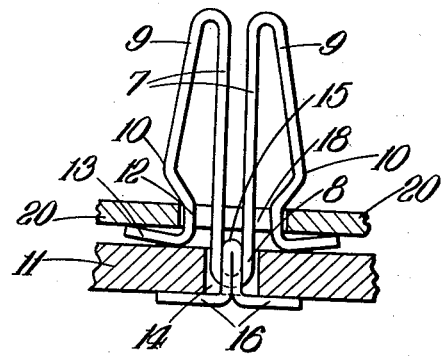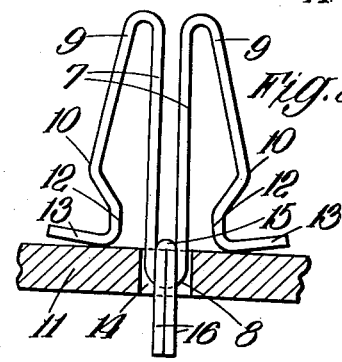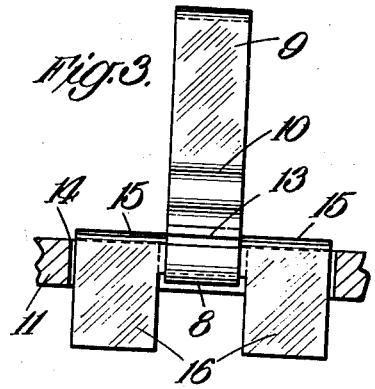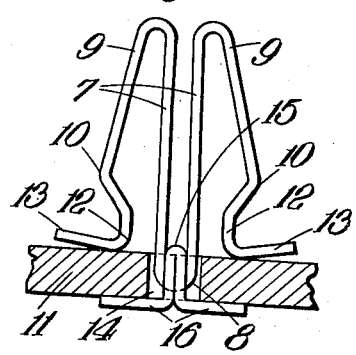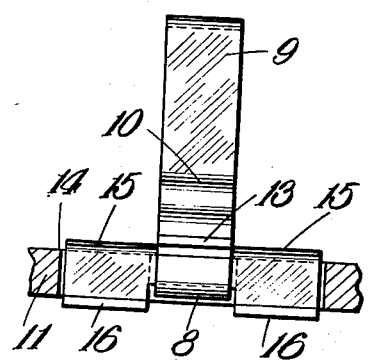

1,959,096

UNITED STATES PATENT OFFICE 1,959,096

TRIM PAD FASTENER

Eric Birger Fernberg, Edgware, England, assignor to The Pressed Steel Company of Great Britain Limited, Oxfordshire, England, a British company Application August 4, 1932, Serial No. 627,486
In Great Britain December 24, 1931

6 Claims. (Cl. 24—213)

My invention relates to fasteners and particularly to securing means of the snap-fasteners type for mounting elements, such as trim pads, upholstery, carpets and the like, on walls, panels, floors and similar bases.

An application of the invention, in which I am, at present, more particularly interested, is in attaching upholstery and carpet to sheet-metal, as in automobiles and other passenger-carrying devices.

One object of my invention is to provide a device of the above-indicated character that shall be simple and durable in construction, economical to manufacture and effective in its operation.

Another object is to provide greater transverse leverage, a more gradual lead-in taper, a better securing base and other features rendering the device more effective and better adapted for a wide variety of uses.

In upholstering practice, as in connection with metal vehicle bodies, it has been usual to mount a trim pad, of sheet millboard or other suitable material, on a metal panel or frame, the millboard constituting a base for the upholstery.

To secure the pads in position, it has been customary to secure spring clips, of various types, to the pads and to press the clips through openings in the panels.

However, in the prior practice, difficulty has been encountered in securing the trim pads, garnish rails and other articles to the metal plates, or frames, so that, when mounted, no relative movement occurs between the pads and the panel or base. Another objection has been the unsightly trimming sometimes caused by cavities and projections on the clips next to the pads.

It is my aim to overcome the disadvantages above-mentioned, and to provide a fastener having improved anchorage and greater facility of manipulation, and, accordingly, in practicing my invention, I provide an arm extending substantially normal to the base and having, at least in effect, a return-bent resilient extension sloping gradually to a position aside the axis of the arm close to the base, from which position the extension continues, at a slope, toward the arm axis.

The inner end of the latter portion may be, and preferably is, continued in a reverse direction along the base.

Although, one such arm, with its extensions, may suffice in certain cases, I prefer to employ a pair thereof in closely adjacent substantially parallel relation, to obtain the effect of one of the arms at each of opposite sides of the device and to render the structure symmetrical, since the structure lends itself readily to manufacture, in the double form, from a single piece, or strip, of metal.

In either form, however, a loop is readily formed, at the mounting end, for co-operation with a securing element including a section received through the loop and having a bifurcate, or double-arm, structure at each end, or at opposite sides of the loop.

The invention will be better understood by reference to the accompanying drawings, in which Figure 1 is a view, in side elevation, of a fastener constructed in accordance with my invention, in association with a base or upholstery element, and a panel indicated in section, for co-operation therewith, Figures 2 and 4 are views, similar to Fig. 1 the panel being omitted, showing the fastener in preliminary and final stages of assembly on the base, Figures 3 and 5 are views taken at right angles to Figs. 2 and 4, to which they correspond, respectively, Figure 6 is a view similar to Figure 1 but showing the fastener as used for the securing of carpets and, Figure 7 is a view of the device looking from the top of Figure 6, with the carpet removed.

Referring to Figs. 2 and 3, a strip of spring steel, or other suitable material preferably in the form of a strap, is bent to have an intermediate portion 7 of substantially U-shape, including an inner loop-end 8 and oppositely return-bent outer-end extensions 9 gradually divergingly sloping to portions 10, convergingly sloping close to a base 11, from which portions 10 extend substantially parallel portions 12 terminating in portions 13 extending oppositely along, but slightly inclined upwardly from the base 11 to prevent chafing or rubbing thereof when the fastener is mounted.

The base 11 has an opening or slot 14 in which the loop 8 is preferably disposed for the reception of a securing element. The securing element is initially of flat-plane ductile sheet-metal of substantially H-shape having its upright arms 16 and transverse portion or section 15 of strap form of substantial width in the plane of the sheet and bent along its transverse portion to substantially flat-plane U-shape of double-sheet thickness.

This construction and configuration facilitates placing the transverse section 15 in the loop 8, and in the slot 14, as indicated in Figs. 2 and 3, from which condition the now substantially bifurcate ends 16 may be laterally bent, as indicated in Figs. 4 and 5, beyond the lateral limits of the opening 14.

In operation, the extensions 9 are thrust through an opening 18 in a metal plate or sheet 20, which movement gradually moves the long sloping extensions inwardly.

The inward movement being gradual, and the leverage between the outer ends of the extensions and the portions 10 being great, relatively great forces are stored in the springs by a simple easy movement upon the part of the operator.

When the shoulders 10 pass the plate 20, the springs release suddenly to lock the plate 20 in the notches beneath the parts 10, constituted by the portions 12, the latitude provided by said parallel portions 12 permitting the fastener to be used with plates of slightly different thicknesses and to allow for the thickness of trimming between the base 11 and the panel 20.

In this locked position, since the angle of the side arms 9 to the perpendicular, is slight, and the plate 20 is positioned at a relatively great angle thereto, relatively great releasing forces are necessary to contract the arms by moving the sections 10—10 inwardly along the edges of the plate.

By reason of the broad-area relation of the parts, such as the portions 13 on the base 11, the section 15 in the loop 8 and the parts 16 on the underside of the base, a substantial amount of lost motion between the fastener parts proper and the base may be permitted, whereby to compensate for slight discrepancies between the positions of the fasteners on the upholstery and the openings in the plate. Thus, as viewed in Fig. 5, the clip may move back and forth along the section 15, and by reason of its resiliency perpendicular dimensions and also a certain amount of lost motion at right angles to the section 15, the clip has sufficient movement in all directions over an area approaching the plate as to take care of the ordinary discrepancies above mentioned.

At the same time, the structure is sufficiently stable to support its parts accurately and relatively firmly in the position indicated.

In Figure 6 is shown the device as applied to the securing of carpets to the floor-boards.

The spring or clip proper has the same form as is described above, although the parallel portions 12 are not essential in this case as provision for the trimming is not required.

The loop 8 is passed through a slot 21 in a metal disc 22, the centre of the slot being enlarged as at 23 to allow a certain degree of movement of the clip for registration with the hole 24 in the floor-board 25. The clip is held in position by a retainer, designated 31, which is of the same form as is described above. The disc 22 is formed with equiangularly spaced apertures 26 to accommodate the prongs 27 depending from a ring 28 arranged to be partially buried in the pile of the carpet 29. The prongs 27 pass through the apertures 26 and are bent over outwardly, as at 30, to avoid fouling the retainer.

The devices set forth are merely examples of the invention, it being understood that various changes may be effected in the device without departing from the spirit and scope of the invention as set forth in the appended claims.

What I claim as my invention is:

1. In combination, in a fastener, a base having an opening, a resilient strip at one side of the base projecting substantially normal thereto including a portion of substantially U-shape having its inner loop end in said opening and oppositely outwardly return-bent outer free-end extensions gradually divergingly sloping to positions, close to the base, from which they convergingly slope to positions from which they project oppositely along the base, and a securing element at the other side of the base having a portion in the loop and bifurcated ends at opposite sides of the loop extending oppositely beyond the lateral limits of said opening.

2. In combination, in a fastener, a base having an opening, a resilient strip at one side of the base projecting substantially normal thereto including a portion of substantially U-shape having its inner loop end in said opening and return-bent free-end extensions divergingly sloping to positions, close to the base, from which they convergingly slope to positions from which they extend along the base, and a securing element bridging the opening at the other side of the base and having a portion extending transversely through the loop but leaving the entire loop free to flex.

3. In combination, in a fastener, a base having an opening, a resilient strip at one side of the base projecting substantially normal thereto having an inner looped end in said opening and return-bent outer free-end extensions, each gradually sloping to a position, aside the opening close to the base, from which it slopes toward the axis of the opening, and a securing element bridging said opening at the opposite side of the base and passing transverely through the inner looped end of said strip but leaving the entire loop free to flex.

4. In combination, in a fastener, a base, a snap fastener element including an inner loop, and means for securing the element to the base including a member extending transversely through the loop but leaving the entire loop free to flex and oppositely-extening arms at each end of said member extending oppositely-thereto, the fastener element and the securing member being, in general at opposite sides of the base and connected to each other therethrough.

5. In combination, in a fastener, a disc, a snap fastener, means for securing the snap fastener to the disc, the snap fastener and securing means being arranged one on either side of the disc and connected to each other therethrough, apertures in said disc, a ring having depending prongs, the ring and disc being arranged concentrically one on either side of a base, and the prongs being arranged to pass through said base to engage in the apertures in the disc and be clinched thereover.

6. In combination, in a fastener, a plate, a snap fastener, means for securing the snap fastener to the plate, the snap fastener and securing means being arranged one on either side of the plate and connected to each other therethrough, apertures in the plate arranged concentrically about the connection between said snap fastener and its securing means, a closed figure member having depending prongs, the closed figure member and plate being arranged one on either side of a base, and the prongs being arranged to pass through said base to engage in the apertures in the plate and be clinched thereover.

ERIC BIRGER FERNBERG.